United States Patent
Ugolini et al.

(10) Patent No.: US 8,205,929 B2
(45) Date of Patent: Jun. 26, 2012

(54) CAR WITH A SUN ROOF

(75) Inventors: Riccardo Ugolini, San Lazzaro di Savena (IT); Roberto Conconi, Chieti (IT)

(73) Assignee: Ferrari S.p.A., Modena (IT)

( * ) Notice: Subject to any disclaimer, the term of this patent is extended or adjusted under 35 U.S.C. 154(b) by 274 days.

(21) Appl. No.: 11/996,428

(22) PCT Filed: Jul. 21, 2006

(86) PCT No.: PCT/EP2006/064540
§ 371 (c)(1),
(2), (4) Date: Oct. 20, 2008

(87) PCT Pub. No.: WO2007/010046
PCT Pub. Date: Jan. 25, 2007

(65) Prior Publication Data
US 2009/0091161 A1  Apr. 9, 2009

(30) Foreign Application Priority Data

Jul. 22, 2005 (IT) .............................. BO2005A0492

(51) Int. Cl.
*B60J 7/08* (2006.01)
(52) U.S. Cl. .............................. 296/107.17; 296/107.07
(58) Field of Classification Search ............ 296/107.01, 296/107.07, 107.08, 107.16, 107.17, 108, 296/220.01, 146.14
See application file for complete search history.

(56) References Cited

U.S. PATENT DOCUMENTS

| 1,535,008 | A | * | 4/1925 | Zanetti | 296/147 |
| 4,543,747 | A | * | 10/1985 | Kaltz et al. | 49/249 |
| 4,950,022 | A | * | 8/1990 | Pattee | 296/107.17 |
| 5,558,388 | A | * | 9/1996 | Furst et al. | 296/107.2 |
| 5,584,522 | A | * | 12/1996 | Kerner et al. | 296/37.16 |
| 5,975,620 | A | * | 11/1999 | Jambor et al. | 296/108 |
| 6,336,673 | B1 | * | 1/2002 | Rothe et al. | 296/107.17 |
| 6,431,637 | B2 | * | 8/2002 | Maass | 296/146.14 |
| 6,439,642 | B2 | * | 8/2002 | Mac Farland | 296/108 |
| 6,443,517 | B1 | * | 9/2002 | Just et al. | 296/107.09 |
| 6,467,832 | B2 | * | 10/2002 | Schutt et al. | 296/107.08 |
| 6,796,594 | B2 | * | 9/2004 | Antreich | 296/107.08 |
| 6,827,392 | B2 | * | 12/2004 | Doncov et al. | 296/147 |
| 7,156,446 | B2 | * | 1/2007 | Perakis | 296/107.2 |
| 7,404,587 | B2 | * | 7/2008 | Brockhoff | 296/107.17 |
| 2002/0125732 | A1 | * | 9/2002 | Dietl | 296/107.09 |
| 2003/0201658 | A1 | * | 10/2003 | Obendiek et al. | 296/108 |
| 2004/0189058 | A1 | * | 9/2004 | Eiermann | 296/220.01 |

(Continued)

FOREIGN PATENT DOCUMENTS

DE 197 06 444 6/1998

(Continued)

*Primary Examiner* — Glenn Dayoan
*Assistant Examiner* — Paul Chenevert
(74) *Attorney, Agent, or Firm* — Oblon, Spivak, McClelland, Maier & Neustadt, L.L.P.

(57) ABSTRACT

A car including a frame, a passenger compartment, a sun roof supported by the frame that can be set to an open position or a closed position with respect to the passenger compartment, a housing for housing the sun roof when the sun roof is in the open position, and a movable cover for closing the housing. The sun roof includes two rigid roof members which, when the sun roof is in the closed position, are substantially horizontal, substantially coplanar, and positioned seamlessly one behind the other, and, when the sun roof is in the open position, are packed one on top of the other inside the housing.

21 Claims, 5 Drawing Sheets

U.S. PATENT DOCUMENTS

2008/0296925 A1 * 12/2008 Fallis et al. .................. 296/108

FOREIGN PATENT DOCUMENTS

| | | | |
|---|---|---|---|
| EP | 1 531 072 | | 5/2005 |
| FR | 2693956 A1 | * | 1/1994 |
| FR | 2696375 A1 | * | 4/1994 |
| JP | 62120224 A | * | 6/1987 |
| WO | 97 45285 | | 12/1997 |

* cited by examiner

CAR WITH A SUN ROOF

TECHNICAL FIELD

The present invention relates to a car with a sun roof.

BACKGROUND ART

Cars have long been marketed featuring a sun roof, which can be set to a closed position entirely covering the passenger compartment for use in bad and/or cold weather, and an open position in which the passenger compartment is exposed.

A sun roof of the type described above may be made of flexible canvas to fold into the open position. Though cheap and easy to produce, a canvas sun roof has several drawbacks: the canvas tends to age fairly quickly, especially when exposed to weather, thus resulting in a fairly short working life of the sun roof; soundproofing is poor, and the sun roof tends to vibrate noisily when the car is travelling at fairly high speed, so that the passenger compartment is noisy even when the roof is closed; and, finally, security is poor, in that a canvas sun roof can be cut simply using a knife, for illegal access to the interior of the car.

For all the above reasons, recent car models feature a rigid sun roof, which normally comprises two or more rigid roof members hinged to each other and which collapse one on top of the other into the open position. One proposal, for example, comprises a first rigid roof member defining the roof and top of the passenger compartment; and a second rigid roof member which is hinged to the first, incorporates a transparent rear window, and defines the rear of the passenger compartment.

In the collapsed position, known rigid sun roofs of the above type are bulky, and so call for a large sun roof housing at the rear of the car. The large size of the roof housing seriously reduces the loading space in the boot of front-engine cars, and even prevents adoption of this solution in the case of central- or rear-engine cars.

DISCLOSURE OF INVENTION

It is an object of the present invention to provide a car with a sun roof, which car is cheap and easy to produce and, at the same time, eliminates the aforementioned drawbacks.

According to the present invention, there is provided a car with a sun roof, as claimed in the accompanying Claims.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
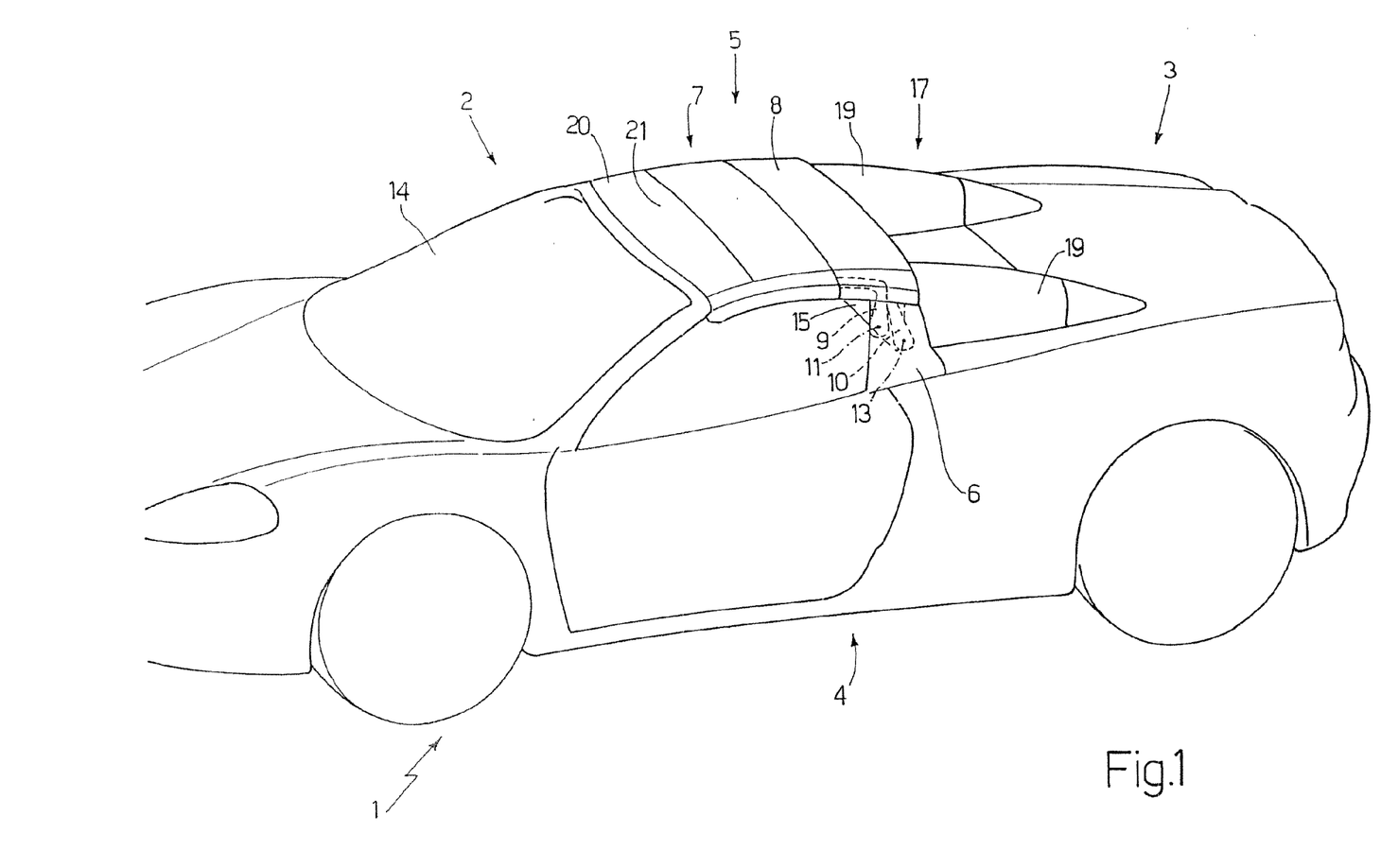
FIG. 1 shows a schematic view in perspective of a car in accordance with the present invention and featuring a sun roof shown in a closed position.
Figure 7:
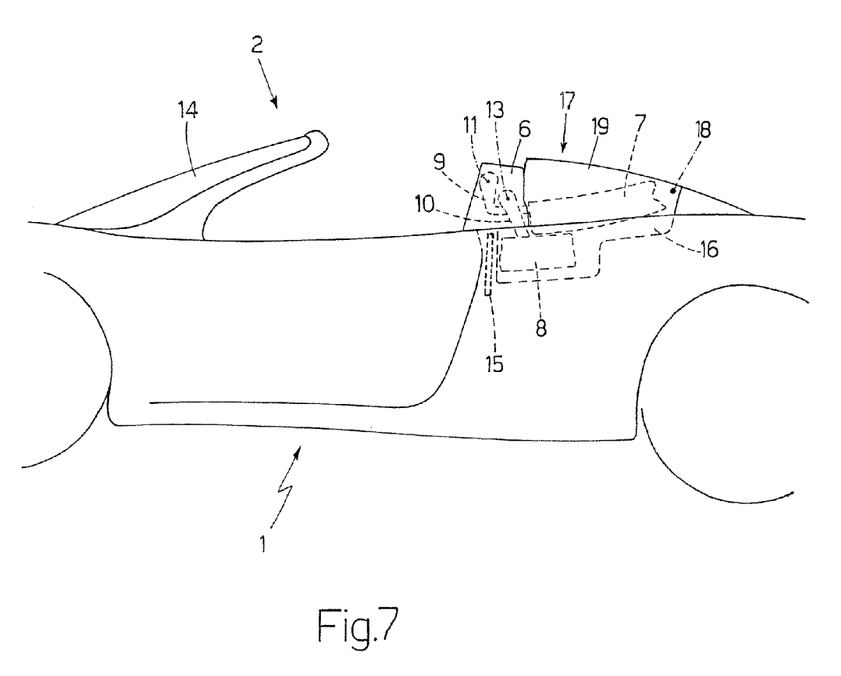

Number 1 in FIG. 1 indicates a car comprising a passenger compartment 2; and a central engine compartment 3 behind passenger compartment 2 and closed by a partly transparent bonnet. A frame 4 of car 1 supports a sun roof 5, which can be set to an open position (shown in FIG. 7) completely exposing passenger compartment 2, or a closed position (shown in FIGS. 1 and 3) completely covering passenger compartment 2.

Figure 2:
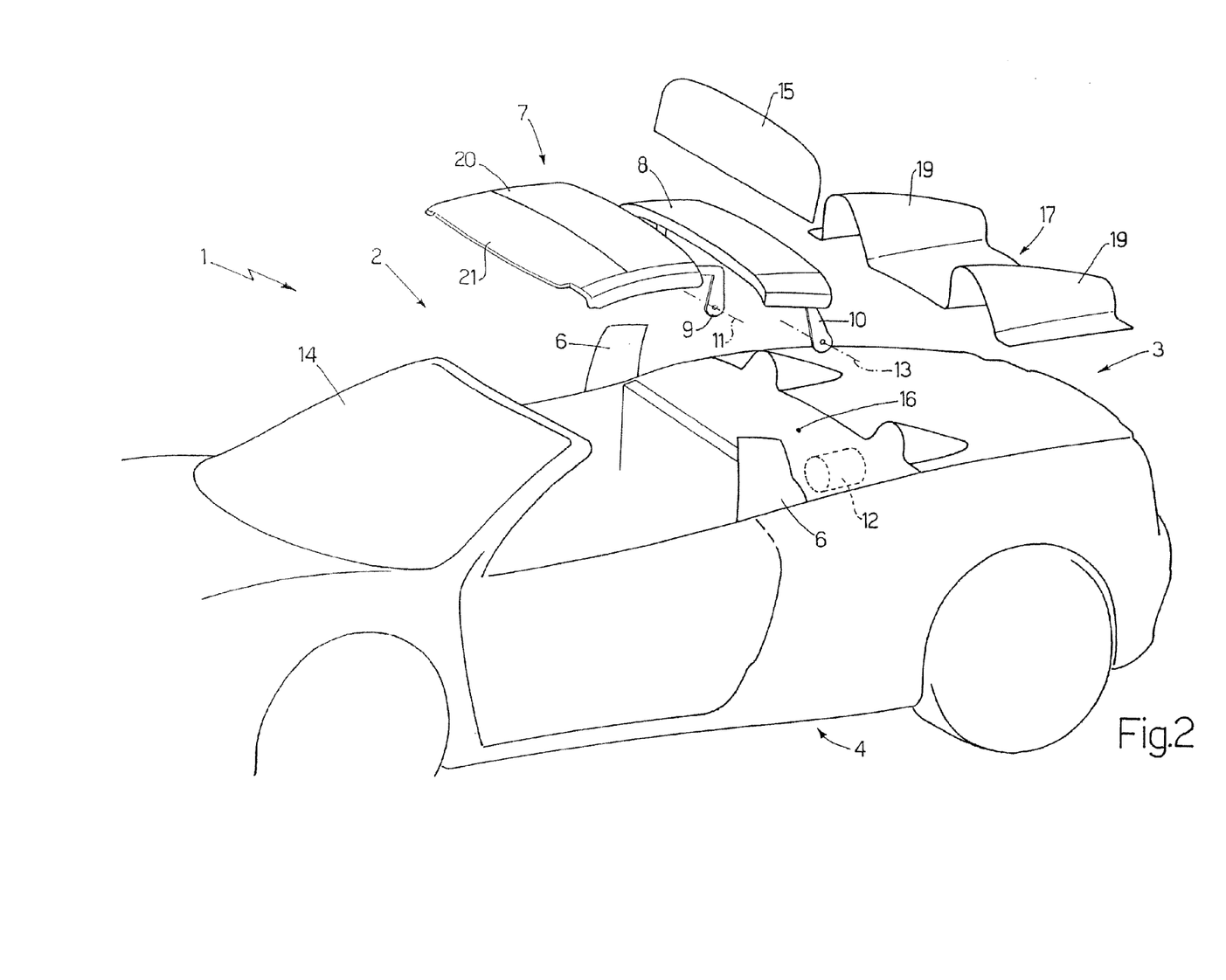
FIG. 2 shows a partly exploded view of the sun roof of the FIG. 1 car.

As shown in FIGS. 1 and 2, to support sun roof 5, frame 4 comprises two vertical posts 6 facing each other on opposite sides of car 1, at the boundary between passenger compartment 2 and engine compartment 3. Sun roof 5 comprises two rigid roof members 7 and 8, each of which has two connecting arms, 9 and 10 respectively, located on opposite sides of relative roof member 7, 8, for mechanical connection to posts 6 of frame 4.

More specifically, each arm 9 is L-shaped, and has one end fixed rigidly to roof member 7, and an opposite end hinged to a post 6 and rotated, with respect to post 6, about a horizontal rotation axis 11 by an actuating device 12; and each arm 10 is substantially straight, and has one end fixed rigidly to roof member 8, and an opposite end hinged to a post 6 and rotated, with respect to post 6 and by actuating device 12, about a horizontal rotation axis 13 parallel to and offset with respect to rotation axis 11. In an alternative embodiment not shown, roof member 7 and/or roof member 8 are/is connected to each post 6 by an articulated quadrilateral to rotate and translate, as opposed to simply rotating, with respect to post 6. Normally, roof member 7 is connected to each post 6 by an articulated quadrilateral, and roof member 8 is connected to posts 6 by arms 10. In the preferred embodiment shown in the attached drawings, rotation axes 11 and 13 are fixed, i.e. do not translate. If an articulated quadrilateral is adopted, rotation axis 11 and/or rotation axis 13 may be movable, i.e. in use, may move parallel to themselves/itself.

When sun roof 5 is in the closed position (FIGS. 1 and 3), roof members 7 and 8 are substantially horizontal, substantially coplanar, and positioned seamlessly one behind the other. More specifically, when sun roof 5 is in the closed position (FIGS. 1 and 3), roof member 7 is located in front, with its front end resting on the windscreen 14 of car 1, and with its rear end contacting the front end of roof member 8; and roof member 8 is located at the rear, with its front end contacting the rear end of roof member 7, and with its rear end contacting the rear window 15 of car 1.

Figure 3:
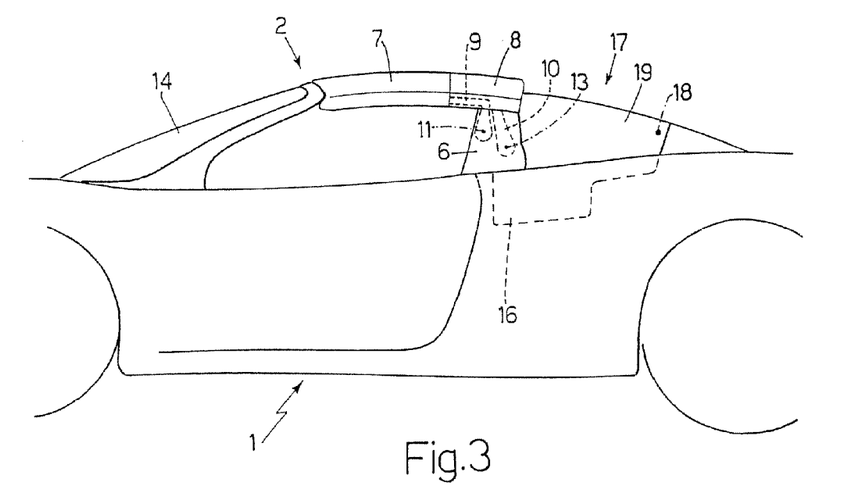
FIGS. 3-7 show side views of the FIG. 1 car illustrating successive stages in opening the sun roof.

It should be pointed out that roof members 7 and 8 are not connected mechanically to each other, but simply rest one against the other when sun roof 5 is in the closed position (FIGS. 1 and 3).

When sun roof 5 is in the open position (FIG. 7), roof members 7 and 8 are housed inside a housing 16, which is formed over engine compartment 3, immediately adjacent to posts 6 and rear window 15, and is closed by a cover 17 hinged at the rear to rotate about a horizontal rotation axis 18 parallel to rotation axes 11 and 13. In a preferred embodiment, cover 17 is opened/closed by an electric or hydraulic power actuator (not shown). Alternatively, cover 17 may be hinged to frame 4 by straightforward hinges, or may be connected to frame 4 by two articulated quadrilaterals to rotate and translate with respect to frame 4.

As will be clear from the above description, roof members 7 and 8 rotate roughly 180° about rotation axes 11 and 13 and with respect to posts 6 of frame 4 to move sun roof 5 from the closed to the open position and vice versa.

Cover 17 preferably comprises two fins 19, which are located on opposite sides of cover 17, act as a roll-bar in the event of roll-over of car 1, and rest on vertical posts 6 when cover 17 is in a closed position closing housing 16.

Roof members 7 and 8 are stowed substantially horizontally, one on top of the other, inside housing 16. That is, inside housing 16, roof members 7 and 8 are packed vertically, one on top of the other, and, more specifically, with roof member 7 on top of roof member 8. In an alternative embodiment not shown, roof members 7 and 8 are stowed vertically, one against the other, inside housing 16.

Figure 4:
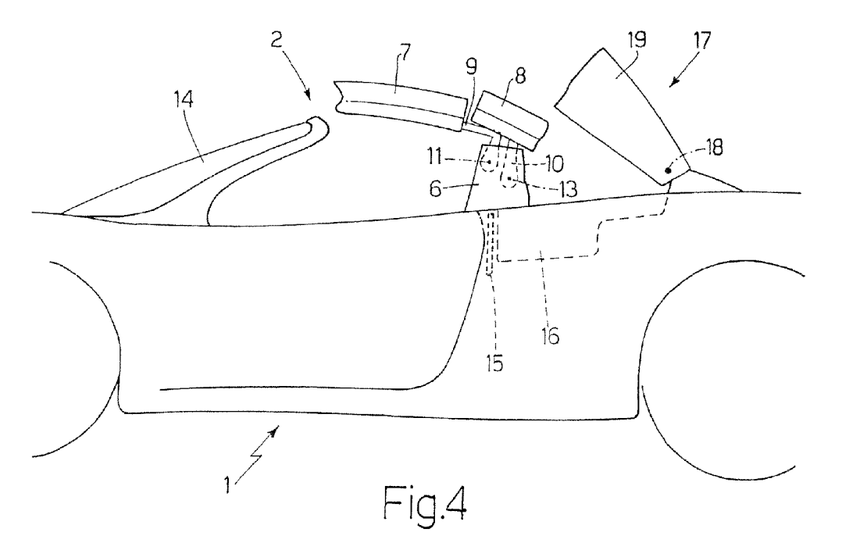
Figure 5:
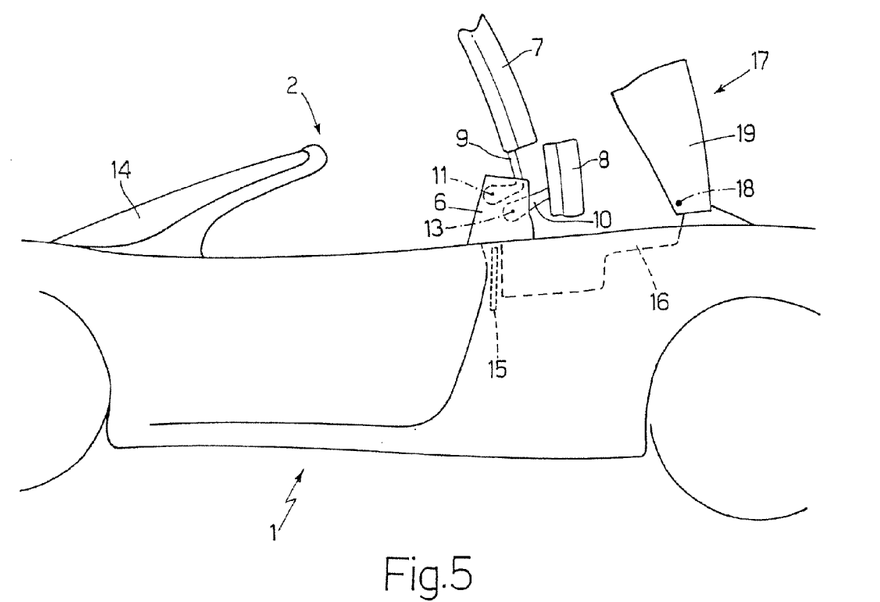
Figure 6:
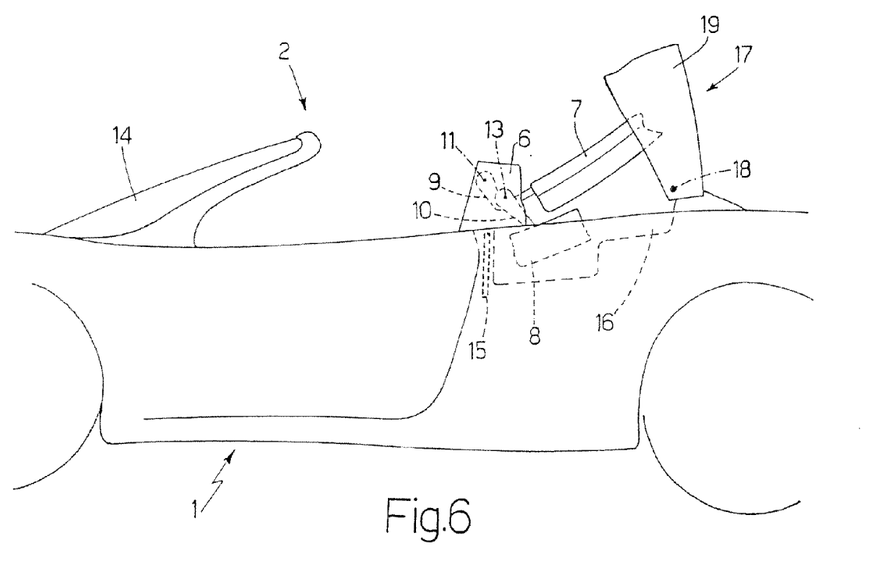

To move sun roof 5 from the closed position (FIGS. 1 and 3) to the open position (FIG. 7) and vice versa, actuating device 12 rotates roof member 7 about rotation axis 11, and rotates roof member 8, independently of roof member 7, about rotation axis 13, as shown in FIGS. 4, 5 and 6. Rotation of roof members 7 and 8 may be simultaneous or in series, i.e. actuating device 12 may rotate both roof members 7 and 8 simultaneously or one after the other. For obvious reasons of mechanical interference, roof member 8 must always be rotated slightly ahead of roof member 7 when opening sun roof 5, and vice versa when closing sun roof 5.

To permit the above movements of roof members 7 and 8 to and from housing 16, rear window 15 is movable, parallel to itself and substantially vertically, between an extracted position (shown in FIGS. 1 and 3) in which rear window 15 projects from the car body, and a withdrawn position (shown in FIGS. 4-7) in which rear window 15 is housed inside the car body, in a respective seat (not shown) formed between passenger compartment 2 and housing 16 of roof members 7, 8. In actual use, rear window 15 is set to the withdrawn position when both opening and closing sun roof 5, to avoid interfering with rotation of roof members 7 and 8.

In a preferred embodiment, rear window 15 comprises a flat transparent panel positioned substantially vertically (or tilted at an appropriate angle to prevent reflection on the interior rearview mirror of car 1) and supported by a metal frame (not shown in detail) fitted to two vertical lateral runners (not shown) to move parallel to itself between the extracted position, in which rear window 15 projects from the car body, and the withdrawn position, in which rear window 15 is housed inside the car body.

When sun roof 5 is in the closed position, rear window 15 is normally set to the extracted position, but may, at the driver's discretion, be set to the withdrawn position to improve ventilation of passenger compartment 2. Likewise, when sun roof 5 is in the open position, rear window 15 is normally set to the withdrawn position, but may, at the driver's discretion, be set to the extracted position to act as a windbreak to reduce turbulence inside passenger compartment 2.

In a preferred embodiment, roof member 7 comprises an outer frame 20; and a rigid movable central portion 21 fitted to outer frame 20 to move, with respect to outer frame 20, between an extracted position, in which central portion 21 is coplanar with outer frame 20 to completely close passenger compartment 2, and a withdrawn position, in which central portion 21 is located beneath a rear portion of outer frame 20 to form a top opening of passenger compartment 2. Central portion 21 preferably slides between the extracted and withdrawn positions along lateral runners (not shown) fitted to outer frame 20, and under the control of an electric actuating device (not shown). In one possible embodiment, central portion 21 is made of transparent or semitransparent glass. Outer frame 20 preferably surrounds central portion 21 on all four sides. In an alternative embodiment not shown, outer frame 20 may only surround central portion 21 on three sides, leaving the front side at windscreen 14 substantially free when sun roof 5 is in the closed position.

Central portion 21 of roof member 7 is preferably rigid and formed in one piece. Alternatively, central portion 21 of roof member 7 may be slatted and comprise a number of rigid slats (not shown), which are hinged to and slide along two lateral side members of outer frame 20 between the extracted position, in which the slats are positioned horizontally side by side, and the withdrawn position, in which the slats are packed vertically one on top of another.

Before roof member 7 is stowed inside housing 16 as described above, central portion 21 of roof member 7 is always set to the withdrawn position, so that roof member 7 assumes a "C" shape and is more compact centrally. Housing 16 may therefore also be C-shaped to match the shape and size of roof member 7 and so reduce the longitudinal dimension of the central portion of housing 16 to the advantage of engine compartment 3 and the bonnet (not shown).

It should be pointed out that car 1 in the attached drawings has a central longitudinal engine, which therefore calls for considerable space longitudinally in the central area of the engine compartment, but leaves the lateral areas relatively clear, so that a C-shaped housing 16 satisfies the space requirements of engine compartment 3 perfectly. Cover 17 of housing 16 is obviously also C-shaped like housing 16; in which case, the two fins 19 of cover 17 define the lateral appendixes of the "C".

All the movements described above are preferably performed using actuating device 12 to move roof members 7 and 8; an actuating device (not shown) to move rear window 15; an actuating device (not shown) to move cover 17 of housing 16; and an actuating device (not shown) to move central portion 21 of roof member 7. All the above actuating devices are preferably electric, but may be pneumatic or hydraulic. In an alternative embodiment, some or all of the above movements may be performed manually by the driver of car 1. Though obviously more inconvenient to the driver, such a solution provides for reducing the cost, size, and weight of sun roof 5.

In an alternative embodiment not shown, as opposed to being supported by frame 4, roof member 7 is supported by roof member 8, and moves, with respect to roof member 8, between an extended position, in which roof member 7 is coplanar with roof member 8, and a collapsed position, in which roof member 7 is packed on top of or beneath roof member 8. Roof member 7 may be connected mechanically to roof member 8, so as to translate, or rotate, or rotate and translate with respect to roof member 8 between the collapsed position and the extended position.

When sun roof 5 moves from the closed to the open position, as opposed to rotating about rotation axis 11, as described above, roof member 7 is collapsed on top of or beneath roof member 8 by translating, or rotating, or rotating and translating with respect to roof member 8, which is then rotated about rotation axis 13 and inserted, together with roof member 7, inside housing 16, in the same way as described above.

Sun roof 5 as described above has numerous advantages, by being cheap and easy to produce, and, in the collapsed position, being extremely compact and perfectly compatible with the characteristics of a central- or rear-engine car 1. Moreover, any configuration of sun roof 5 also allows full access to and use of the rear of passenger compartment 2, located behind the seats and normally used for stowing small items of luggage. Finally, rear window 15 is made of glass, with obvious advantages in terms of visibility and soundproofing, permits installation of an electric defrosting and/or defogging device, and also acts as a windbreak when sun roof 5 is in the open position.

By virtue of its extremely compact size when collapsed, sun roof 5 as described above is ideal for use in a central- or rear-engine car 1 of the type shown in the attached drawings, but, given its numerous advantages, may also be used to advantage in a front-engine car.

The invention claimed is:

1. A car, comprising:
a frame comprising two vertical posts projecting from a body of the car and facing each other on opposite sides of the car;
a passenger compartment;
a sun roof supported by the frame and configured to be set to an open position or a closed position with respect to the passenger compartment;
a rear window that is arranged between the two vertical posts and is separate and independent from the sun roof;
a housing for housing the sun roof when the sun roof is in the open position; and
a movable cover for closing the housing;
wherein the sun roof comprises front and rear rigid roof members which, when the sun roof is in the closed position, are substantially horizontal, substantially coplanar, and positioned seamlessly one behind the other, and, when the sun roof is in the open position, are packed one against the other inside the housing;
wherein to permit movement of the roof members to and from the housing, the rear window is movable, parallel to itself and substantially vertically, between an extracted position, in which the rear window projects from the car body and is arranged between the two vertical posts, and a withdrawn position, in which the rear window is housed inside the car body, inside a seat formed between the passenger compartment and the housing of the roof members;
wherein each of the roof members is connected mechanically to the frame by two connecting arms located on opposite sides of the roof member;
wherein the connecting arms are located between the vertical posts of the frame such that the connecting arms are located in a space laterally bound by the vertical posts of the frame;
wherein, when the sun roof is in the closed position, lateral portions of the rear roof member are arranged supported on upper edges of the vertical posts of the frame and a central portion of the rear roof member is supported on an upper edge of the rear window in the extracted position;
wherein, when the sun roof is in the closed position, a rear edge of the rear roof member is vertically aligned with the rear edge of the vertical posts of the frame;
wherein, when the sun roof is in the open position, inside the housing the front roof member is arranged supported on the rear roof member; and
wherein the roof members are rotated simultaneously and both in a same direction of rotation to move the sun roof from the closed position to the open position.

2. A car as claimed in claim 1, wherein, when the sun roof is in the open position, the rigid roof members are stowed substantially horizontally in the housing and packed vertically one on top of the other.

3. A car as claimed in claim 1,
wherein the front roof member, located at the front when the sun roof is in the closed position, is supported by the rear roof member, located at the rear when the sun roof is in the closed position, so as to move, with respect to the rear roof member, between an extended position, in which the front roof member is coplanar with the rear roof member, and a collapsed position, in which the front roof member and the rear roof member are packed together.

4. A car as claimed in claim 1,
wherein, when the sun roof is in the closed position, the front roof member is located at the front, with a front end of the front roof member resting on a windscreen of the car, and with a rear end of the front roof member contacting a front end of the rear roof member located at the rear; and the rear roof member is located at the rear, with the front end of the rear roof member contacting the rear end of the front roof member, and with a rear end of the rear roof member contacting the rear window of the car.

5. A car as claimed in claim 1, wherein the two vertical posts project from the body of the car when the sun roof is in the open position.

6. A car as claimed in claim 1, wherein the two vertical posts are fixed in place projecting from the body of the car.

7. A car as claimed in claim 1, wherein the cover of the housing of the sun roof includes two fins on opposite sides of the cover.

8. A car as claimed in claim 7, wherein the fins of the cover rest on the vertical posts when the cover is in a closed position closing the housing.

9. A car as claimed in claim 1, wherein the roof members are fitted to the frame by the connecting arms, the connecting arms being hinged to the frame.

10. A car as claimed in claim 9, wherein the roof members rotate about respective horizontal rotation axes and with respect to the frame to move the sun roof from the open position to the closed position and vice versa.

11. A car as claimed in claim 10, wherein the roof members rotate roughly 180° about the respective horizontal rotation axes and with respect to the frame to move the sun roof from the open position to the closed position and vice versa.

12. A car as claimed in claim 1, wherein the sun roof is supported by the two vertical posts.

13. A car as claimed in claim 12,
wherein the front roof member, located at the front when the sun roof is in the closed position, is supported by the rear roof member, located at the rear when the sun roof is in the closed position, so as to move, with respect to the rear roof member, between an extended position, in which the front roof member is coplanar with the rear roof member, and a collapsed position, in which the front roof member and the rear roof member are packed together; and the connecting arms that connect the rear roof member to the posts of the frame are two second connecting arms located on opposite sides of the rear roof member.

14. A car as claimed in claim 13, wherein each of the second connecting arms of the rear roof member is substantially straight, and has one end fixed rigidly to the rear roof member, and an opposite end hinged to the post to rotate, with respect to the post, about a horizontal second rotation axis.

15. A car as claimed in claim 1, wherein the two roof members rotate about two separate rotation axes, so that the front roof member is brought to rest on the rear roof member when the sun roof moves from the closed position to the open position.

16. A car as claimed in claim 15, wherein the connecting arms that connect the front roof member to the vertical posts are first connecting arms and each of the first connecting arms of the front roof member is L-shaped, and has one end fixed rigidly to the front roof member, and an opposite end hinged to the post to rotate, with respect to the post, about a horizontal first rotation axis; and
a second connecting arm of the rear roof member is substantially straight, and has one end fixed rigidly to the rear roof member, and an opposite end hinged to the post to rotate, with respect to the post, about a horizontal second rotation axis parallel to and offset with respect to the first rotation axis.

17. A car as claimed in claim 15, further comprising an actuating device for moving the roof members with respect to the frame, and to move the sun roof from the closed position to the open position and vice versa, wherein the actuating device moves the two roof members simultaneously with respect to the frame.

18. A car as claimed in claim 1, wherein the front roof member of the two roof members, located at the front when the sun roof is in the closed position, comprises an outer frame; and a movable central portion fitted to the outer frame to move, with respect to the outer frame, between an extracted position, in which the central portion is coplanar with the outer frame to completely close the passenger compartment, and a withdrawn position, in which the central portion is located beneath a rear portion of the outer frame to form a top opening of the passenger compartment.

19. A car as claimed in claim 18, wherein the outer frame surrounds the central portion on all four sides.

20. A car as claimed in claim 18, wherein the outer frame only surrounds the central portion on three sides, leaving a front side at a windscreen substantially free when the sun roof is in the closed position.

21. A car as claimed in claim 18, wherein the central portion of the front roof member is rigid and formed in one piece.

* * * * *